United States Patent Office 2,952,575
Patented Sept. 13, 1960

2,952,575

NEAR-INFRARED SPECTRUM FILTER MEDIA

Donald H. Baltzer, Cincinnati, Ohio, assignor to Monsanto Chemical Company, St. Louis, Mo., a corporation of Delaware No Drawing. Filed May 16, 1958, Ser. No. 735,709

12 Claims. (Cl. 154—2.65)

The present invention is directed to filtering of near infrared spectrum radiation and more particularly to media capable of selectively filtering this segment of the electro-magnetic spectrum.

The radiated energy of the sun, which is terrestrially effective, consists approximately of 12% ultra-violet, up to 400 millimicrons wavelength, 36.5% visible, from 400 to 700 millimicrons, and 48.5% near infrared heat rays, from 700 to 2600 millimicrons. Near infrared radiation has been noted by medical authorities as causing injury to the optic nerves and other delicate parts of the eye. In addition, radiations of this nature are accompanied by heat which under certain conditions are undesirable. Ordinary glass absorbs a total of only about 3% for the entire spectrum and in addition reflects about 4% of the visual at each surface. Ordinary glass then, both proportionately and collectively, transmits more of this undesirable light than the desirable visual light.

Various expedients have been presented as solutions to the problem. Of the two most commonly practiced, one calls for vacuum coating thin films of metals onto various substrates, the latter both rigid and flexible in nature, such as glass and various synthetic polymeric materials. The other utilizes multiple layers of transparent materials having selective refractive indices and controlled thicknesses. These, however, leave much to be desired. In particular, infinite care is required to produce effective filter media using either of the foregoing expedients. Further with respect to the vacuum coated metal filters, in spite of the care exercised these generally cannot be used for automotive and like critical purposes in that they lack selectivity as to wavelength, consequently interfering with radiations over the entire spectrum. More particularly their high specular reflection in the visible spectrum results in objectionable and frequently dangerous glare.

Accordingly, it is a principal object of the present invention to provide improved near infrared spectrum filter media.

Another object is to provide such media which are lucent (transparent or translucent) with respect to the visual portion of the electro-magnetic spectrum.

Other objects of the invention will in part be obvious and will in part appear hereinafter.

These and other objects are attained by providing in combination a lucent supporting material and a sodium-tungstate composition.

The following examples are provided in illustration of the present invention. Where parts are mentioned, parts by weight are intended unless otherwise indicated.

Example I

Twenty-four grams $Na_2WO_4.2H_2O$ and 46.0 grams $WO_3$, both finely divided, and 5.0 grams of —325 mesh tungsten metal are thoroughly mixed in a mortar, then transferred to a graphite crucible and heated to 800° C. under an argon atmosphere for 90 minutes. The reaction mixture is then quenched by dumping the contents of the crucible immediately into 1000 ccs. of water. After filtering the cake which results is washed with 800 ccs. of water to remove any unreacted $Na_2WO_4$. Finally, the bronze is dried for 3 hours at 90° C. giving a yield of 66.3 grams. The tungsten bronze (sodium tungstate composition) has a particle size range of 0.15–12 microns with an average particle size of 3–5 microns. The bronze is then ground in a high intensity attrition mill to give a uniform particle size, the average of which is less than .4 micron, 400 millimicrons. The material is again washed with water, then alcohol, and dried.

Example II

A 3.5 gram portion of the material produced according to Example I is mixed with 150 grams of plasticizer and about 950 grams of granular polyvinyl butyral resin in a ball mill at room temperature to give essentially even distribution of the sodium-tungstate bronze throughout the mass. The polymeric mass is dried and compacted into a smooth cake of rectangularly parallelepipedal shape. Sheets are then skivered off the cake having thicknesses of 10, 20 and 30 mils. When tested in a light transmittance meter, the following results are observed:

| Sample Thickness, mils | Percent Transmission at 550 mm. (visual) | Percent Transmission at 1000 mm. (near infrared) |
|---|---|---|
| 10 | 75 | 45 |
| 20 | 50 | 18 |
| 30 | 25 | 4 |

The test results indicate that the material is an effective filter for near infrared spectrum and that concentration, area and thickness of the sodium-tungstate material can be regulated to give results desired for particular applications. In low concentrations, the hue exhibited by the material is faint greenish-yellow which intensifies toward the green as concentration increases.

When the above sheets are interposed between glass laminae and exposed to sunlight for a period of 500 days no discoloration is discerned.

Example III

The material produced according to Example I is incorporated into polyvinyl butyral by milling about 4.2 grams of the dry particulate material with about 450 grams of the butyral in a roll mill until the sodium-tungstate is uniformly distributed. Sheets of the resulting products are formed as directed and subjected to the test procedures of Example II. Substantially the same standards of performance as before are again enjoyed.

Example IV

A 40 gram portion of the material produced according to Example I is thoroughly mixed in about 450 grams of nitrocellulose lacquer to form a varnish which is coated onto a panel of glass and then is air dried. When tested according to Example II procedure, the material exhibits filtering activity in the near infrared spectrum.

Example V

The procedure according to Example IV is repeated with the exception that the varnish containing the sodium-tungstate is applied by spraying to a semi-rigid panel of copolymerized styreneacrylonitrile. When tested, this material exhibits filtering in the near infrared spectrum.

The present invention is directed to the provision of near infrared spectrum filter media comprising in combination a lucent support material and a sodium-tungstate composition. The latter preferably in particulate form having an average particle size of less than 1000 millimicrons and preferably less than 400 millimicrons with a further preference directed to 40–200 millimicrons.

The support materials to which the present invention is directed includes those which are lucent, either transparent or translucent, to the visual portion of the electromagnetic spectrum. Various glasses and synthetic polymeric materials can be used, the latter including polyethylene terephthalate, polyethylene, polyvinyl acetate, polystyrene, polyvinyl butyral, cellulose acetate, poly acrylates, alkyd resins, phenol-formaldehyde, urea formaldehyde, other aminoplast resins, and the like. These materials are preferably chemically inert toward the sodium-tungstate composition, and in cases where a resin carrier is utilized, to the carrier. The support materials can be used in the form of substrates or overlays, or collectively laminae, and a laminate construction can be used to interpose a film of the sodium-tungstate composition and protect it for continued use. The laminate construction, particularly with regard to the particular support materials used, can vary according to the occasion for its utilization or application. In a preferred embodiment, the sodium-tungstate is incorporated into the support material as by conjunctively milling, rolling or subjecting the tungsten-bronze to like physical operations, together with the support material which is in polymeric form and which in turn be coated onto more rigid materials such as glass, synthetic polymeric materials, etc. The incorporation operation can be carried out dry or wet and the sodium-tungstate can be in the presence of various adjuvants including lubricants, liquid vehicles such as paints, varnishes, lacquers, including drying oils and semi-drying oils, alkyd modified drying oils and semi-drying oils, shellacs, etc., also solvents, suspension systems and the like. It is also possible to incorporate the sodium-tungstate during production of the support material as for example during the polymerization operation using analogous procedures.

The sodium-tungstate-bronze composition which is preferred is that which can be produced by subjecting a mixture of $Na_2WO_4 \cdot 2H_2O$, sodium tungstate, $WO_3$, tungsten oxide, and powdered tungsten metal to temperatures on the order of 650–850° C. The sodium tungstate is particulate in form, suggested average particle sizes being less than 1000 millimicrons (1 micron) and preferably less than 400 millimicrons with a further preference directed to 40 to 200 millimicrons. The sodium content of the material is preferably 0.8% to 0.9% by weight. The latter exhibits a yellow-green coloration of transmitance. When utilized in conjunction with lacquers and other liquid vehicles which themselves are retained in wet or dry form the vehicle can then itself be considered as supporting material. When used as a film, thickness and concentration of the film area are interrelated properties directly bearing on the quantity of filtering effected in the near infrared spectrum. A particularly attractive range of thicknesses is 0.001 to 0.050″. The composition can be incorporated into the various supporting materials using analogous procedures, again the effectiveness of the filtering is dependent upon the thickness and area concentration in a given mass of support material.

The products resulting in the present invention have broad utility in the fields of optics as well as in structural and vehicular uses. When used as visual panels, they minimize injury to the eye and as well contribute bodily comfort by reducing radiated heat. The products have a pleasing coloration which does not substantially interfere with either depth or color perspective. Various colorants which are compatible can also be included either directly with the sodium-tungstates or separately in the supporting material to vary the color scheme. These depend on the nature of the supporting or carrying vehicle; with polyvinylbutyral for example, oil soluble dyes, azo and anthraquinone types are useful. If used in a varnish coating on glass, organic pigments of the class of copper phthalocyanine are more desirable.

It will thus be seen that the objects set forth above, among those made apparent from the preceding description are efficiently attained and, since certain changes may be made in the attainment and utilization of the above described invention without departing from the scope thereof, it is intended that all matter contained in the above description shall be interpreted as illustrative and not in a limiting sense.

What is claimed is:

1. A near infrared spectrum filter medium comprising in combination a lucent support material and a particulate sodium-tungstate composition having an average particle size of less than about 1000 millimicrons.

2. A near infrared spectrum filter medium comprising a lucent support material having incorporated therein a particulate sodium-tungstate composition having an average particle size of less than about 1000 millimicrons.

3. A near infrared spectrum filter medium comprising a lucent support material being contacted with a film of particulate sodium-tungstate composition having an average particle size of less than about 1000 microns.

4. The filter medium according to claim 1 wherein the average particle size of sodium-tungstate is less than 400 millimicrons.

5. The filter medium according to claim 1 wherein the average particle size of sodium-tungstate is between 40 to 200 millimicrons.

6. The filter medium according to claim 1 wherein the sodium-tungstate comprises 0.8 to 0.9% by weight of sodium.

7. The filter medium according to claim 1 wherein the support material comprises glass.

8. The filter medium according to claim 1 wherein the support material comprises a lucent synthetic polymeric material.

9. The filter medium according to claim 3 wherein the film of sodium-tungstate comprises about 0.001 inch to 0.050″ in thickness.

10. A near infrared spectrum laminate-filter comprising a pair of lucent laminae having interposed a particulate sodium-tungstate composition, the average particle size of which is less than about 1000 millimicrons.

11. A process for providing near infrared spectrum filter media which comprises incorporating into a lucent support material a particulate sodium-tungstate composition having an average particle size of less than about 1000 millimicrons.

12. A process for providing near infrared spectrum filter media which comprises contacting a lucent support material with a film of particulate sodium-tungstate composition having an average particle size of less than about 400 millimicrons.

References Cited in the file of this patent

UNITED STATES PATENTS

| | | |
|---|---|---|
| 1,604,761 | Sherts | Oct. 26, 1926 |
| 1,624,443 | St. John | Apr. 12, 1927 |
| 2,150,966 | Eggert et al. | Mar. 21, 1939 |
| 2,327,539 | McAlister | Aug. 24, 1943 |
| 2,624,239 | Blout et al. | Jan. 6, 1953 |
| 2,704,420 | Ohliger | Mar. 22, 1955 |